(12) United States Patent
Eguchi et al.

(10) Patent No.: US 10,650,562 B2
(45) Date of Patent: May 12, 2020

(54) DISPLAY CONTROL DEVICE

(71) Applicant: DENSO TEN Limited, Kobe-shi, Hyogo (JP)

(72) Inventors: Takashi Eguchi, Kobe (JP); Hirokazu Ichihara, Kobe (JP); Daitaro Yamasaki, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 35 days.

(21) Appl. No.: 15/926,063

(22) Filed: Mar. 20, 2018

(65) Prior Publication Data

US 2018/0357805 A1 Dec. 13, 2018

(30) Foreign Application Priority Data

Jun. 8, 2017 (JP) .................................. 2017-113318

(51) Int. Cl.
*G09G 5/00* (2006.01)
*G06T 11/60* (2006.01)

(52) U.S. Cl.
CPC .................................. *G06T 11/60* (2013.01)

(58) Field of Classification Search
CPC .... G09G 5/14; G09G 2340/125; G09G 5/395; G09G 2340/10; G09G 2340/12
USPC ........................................................ 345/634
See application file for complete search history.

(56) References Cited

U.S. PATENT DOCUMENTS

| 7,965,177 B2* | 6/2011 | Kobayashi | B60K 35/00 340/461 |
| 2012/0284646 A1* | 11/2012 | Sitrick | G06Q 10/10 715/753 |
| 2015/0302827 A1* | 10/2015 | Danielsson | G01C 23/00 345/581 |

FOREIGN PATENT DOCUMENTS

JP 2013-213859 A 10/2013

\* cited by examiner

*Primary Examiner* — Gordon G Liu
(74) *Attorney, Agent, or Firm* — Oliff PLC

(57) ABSTRACT

A display control device that displays an image includes an acquirer, a drawer, and an image combiner. The acquirer acquires layer information which defines (i) individual layers corresponding to display regions of a plurality of display devices and (ii) a common layer including the display regions of the plurality of display devices, as layers of images each constituted by a plurality of layers. The drawer draws first combination images to be displayed so as to move among the plurality of display devices in the common layer, and draws second combination images to be independently displayed by the display devices in the individual layers, based on the layer information acquired by the acquirer. The image combiner combines the first combination images drawn in the common layer by the drawer with the second combination images of the corresponding individual layers. Accordingly, it is possible to reduce a processing load when image display is linked between a plurality of displays.

18 Claims, 14 Drawing Sheets

FIG. 3A

| LAYER ID | POSITIONAL RELATIONSHIP | | | SIZE RELATIONSHIP | | |
|---|---|---|---|---|---|---|
| | FIRST DISPLAY DEVICE | SECOND DISPLAY DEVICE | THIRD DISPLAY DEVICE | FIRST DISPLAY DEVICE | SECOND DISPLAY DEVICE | THIRD DISPLAY DEVICE |
| 1 | (X1,Y1) | (X2,Y2) | (X3,Y3) | 1 | $\alpha$ | $\beta$ |
| 2 | (X1,Y1) | (X2,Y2) | (X3,Y3) | 1 | $\alpha$ | $\beta$ |
| 3 | (X1,Y1) | (X2,Y2) | (X3,Y3) | 1 | $\alpha$ | $\beta$ |

FIG. 4

| LAYER ID | CLASSIFICATION | DISPLAY DEVICE ID | DISPLAY CONTENT |
|---|---|---|---|
| LAYER 1 | COMMON | 1~3 | CHARACTERS, CAUTION DISPLAY |
| LAYER 2 | COMMON | 1~3 | NOTIFICATION SCREEN (ARROW, DESIGN IMAGE, OR THE LIKE) |
| LAYER 3 | COMMON | 1~3 | MOVING IMAGE (CAMERA VIDEO) |
| LAYER 4 | INDIVIDUAL | 1 | VEHICLE POSITION |
| LAYER 4 | INDIVIDUAL | 2 | METER IMAGE |
| LAYER 4 | INDIVIDUAL | 3 | GUIDE DISPLAY |
| LAYER 5 | INDIVIDUAL | 1 | MAP |
| LAYER 5 | INDIVIDUAL | 2 | VEHICLE IMAGE |
| LAYER 5 | INDIVIDUAL | 3 | GUIDE PATH |

FIG. 5

| LAYER ID | EVENT CLASSIFICATION ||||
|---|---|---|---|---|
| | ACCIDENT OCCURS AHEAD | VEHICLE APPROACHES FROM BEHIND | WHEN TURNING LEFT | DETECT SURROUNDING OBJECT WHEN VEHICLE IS PARKED | ... |
| LAYER 1 | ○: ACCIDENT OCCURRENCE NOTIFICATION, BYPASSING INSTRUCTION | ○: HAZARD MARK DISPLAY | NONE | ○: BRAKE ANNOUNCEMENT NOTICE | ... |
| LAYER 2 | NONE | ○: NOTIFY OF APPROACH POSITION | NONE | ○: INDUCE MOVEMENT OF VIEWING POINT | ... |
| LAYER 3 | NONE | NONE | ○: SIDE CAMERA ACTUAL VIDEO | ○: CAMERA ACTUAL VIDEO | ... |
| LAYER 4 | CONSTANT DISPLAY |||| ... |
| LAYER 5 | CONSTANT DISPLAY |||| ... |

FIG. 6

| LAYER ID | FIRST DISPLAY DEVICE (REFERENCE) | DISPLAY SIZE RATIO ||||||||| |
|---|---|---|---|---|---|---|---|---|---|---|
| | | ACCIDENT OCCURS AHEAD || VEHICLE APPROACHES FROM BEHIND || WHEN TURNING LEFT || DETECT SURROUNDING OBJECT WHEN VEHICLE IS PARKED || ... |
| | | SECOND DISPLAY DEVICE | THIRD DISPLAY DEVICE | SECOND DISPLAY DEVICE | THIRD DISPLAY DEVICE | SECOND DISPLAY DEVICE | THIRD DISPLAY DEVICE | SECOND DISPLAY DEVICE | THIRD DISPLAY DEVICE | |
| LAYER 1 | 1 | 1 | 0.5 | 0.8 | 0.5 | 0.5 | 1 | 0.5 | 1.2 | ... |
| LAYER 2 | | 0.5 | 0.5 | 0.5 | 1 | 0.5 | 0.8 | 0.5 | 1 | ... |
| LAYER 3 | | 0.5 | 0.5 | 0.5 | 1 | 01 | 0.5 | 0.8 | 1 | ... |

FIG. 7

| LAYER ID | ENTRY | | EVENT CLASSIFICATION | | | | | |
|---|---|---|---|---|---|---|---|---|
| | | | ACCIDENT OCCURS AHEAD | | | VEHICLE APPROACHES FROM BEHIND | | |
| | | | FIRST DISPLAY DEVICE | SECOND DISPLAY DEVICE | THIRD DISPLAY DEVICE | FIRST DISPLAY DEVICE | SECOND DISPLAY DEVICE | THIRD DISPLAY DEVICE |
| LAYER 1 | FONT | | GOTHIC TYPEFACES | MING TYPEFACES | GOTHIC TYPEFACES | MING TYPEFACES | POP TYPEFACES | GOTHIC TYPEFACES |
| | SIZE RATIO | | 1 | 0.8 | 1 | 1 | 0.5 | 0.5 |
| | COLOR | | WHITE | GRAY | ORANGE | BLACK | GRAY | PINK |
| | ... | | ... | ... | ... | ... | ... | ... |
| ... | | | | | | | | |

DISPLAY CONTROL DEVICE

BACKGROUND OF THE INVENTION

Field of the Invention

The present invention relates to a technology for displaying an image.

Description of the Background Art

In recent years, there is a tendency for the number of displays installed within a vehicle to increase. A display control device that performs control for displaying images drawn in a plurality of layers on a plurality of displays has been known. Such a display control device draws images in individual layers corresponding to the plurality of displays, as layers in which images are drawn.

However, in the display control device of the related art, when image display is linked among the plurality of displays, display timings need to be controlled for the individual layers. Thus, the control is complicated, and thus, a processing load increases.

SUMMARY OF THE INVENTION

According to an aspect of the present invention, there is provided a display control device that displays an image. The display control device includes an acquirer that acquires layer information which defines (i) individual layers corresponding to display regions of a plurality of display devices and (ii) a common layer including the display regions of the plurality of display devices, as layers of images each constituted by a plurality of layers; a drawer that draws first combination images to be displayed so as to move among the plurality of display devices in the common layer, and draws second combination images to be independently displayed by the display devices in the individual layers, based on the layer information acquired by the acquirer; and an image combiner that combines the first combination images drawn in the common layer by the drawer with the second combination images of the corresponding individual layers.

Accordingly, it is possible to reduce a processing load when image display is linked between a plurality of displays.

An object of the invention is to provide a display control device capable of reducing a processing load when display is linked between a plurality of displays.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a diagram for describing arrangement information.

FIG. 4 is a diagram for describing content information.

FIG. 5 is a diagram for describing event display information.

FIG. 6 is a diagram for describing format information.

FIG. 7 is a diagram for describing the format information.

DESCRIPTION OF THE EMBODIMENTS

Hereinafter, an embodiment of a display control device will be described in detail with reference to the accompanying drawings. The present invention is not limited by the embodiment.

Figure 1A:
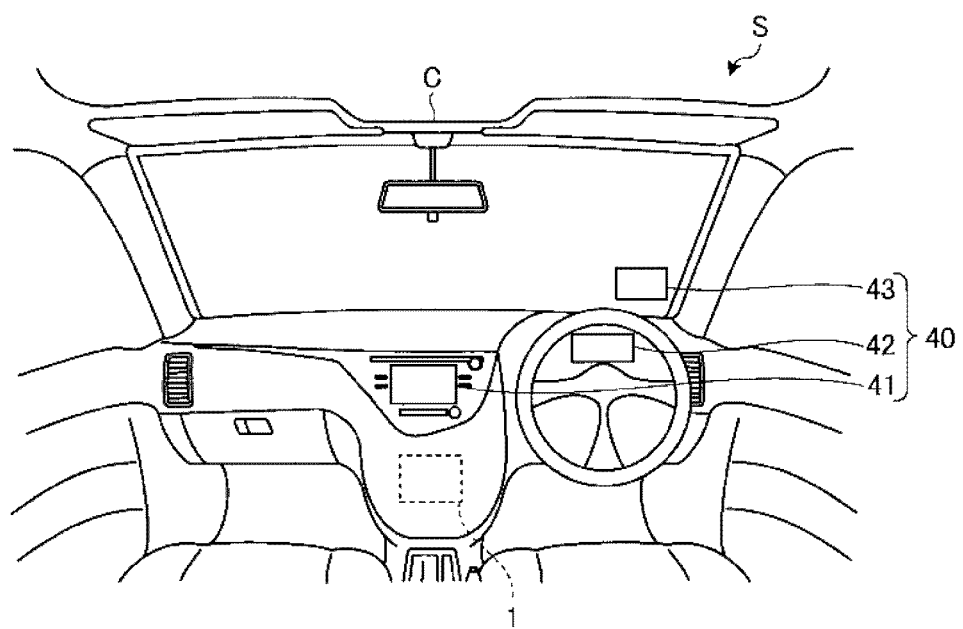
FIG. 1A shows a configuration of a display system according to an embodiment.
Figure 1B:
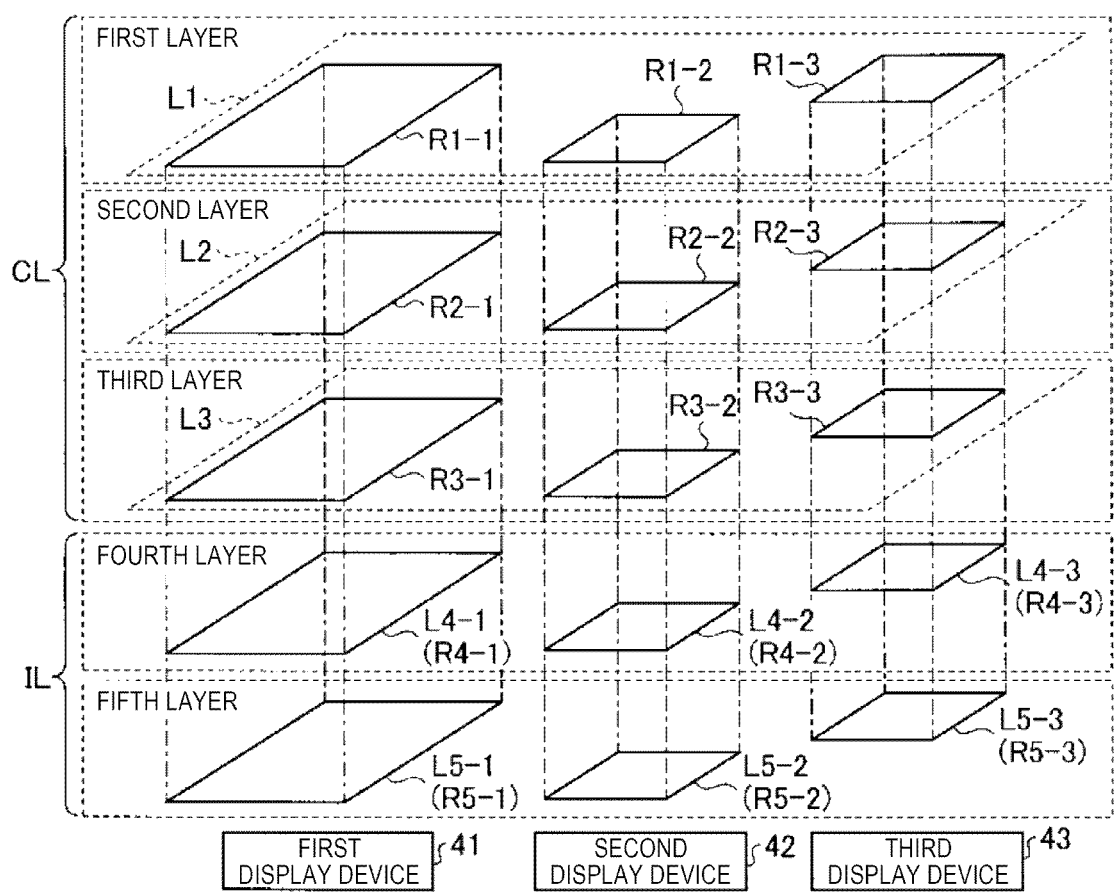
FIG. 1B shows an outline of a display control method according to the embodiment.

An outline of a display control method and a display system including the display control device according to the embodiment will be described with reference to FIGS. 1A and 1B. FIG. 1A shows a configuration of a display system S according to the embodiment. FIG. 1B shows an outline of the display control method according to the embodiment.

FIG. 1A shows a diagram when a front side within a cabin of a vehicle C is viewed. As shown in FIG. 1A, the display system S according to the embodiment is mounted, for example, on the vehicle C. The display system S includes a display device 40 and a display control device 1. The display device 40 includes a first display device 41, a second display device 42, and a third display device 43. The display device 40 is not limited to the display device mounted on the vehicle C. For example, the display device 40 may be a display device such as a personal computer (PC) provided in an office. The number of display devices 40 is not limited to three, and may be two, or four or more.

For example, the first display device 41 is a center display installed in the center on the front side of the vehicle C. The first display device 41 displays an image indicating a navigation function, an image related to music playback, or a moving image of a television. For example, the first display device 41 functions as a receiver that receives an input for a navigation device 12 (see FIG. 2). That is, the first display device 41 may be a touch panel display.

For example, the second display device 42 is a sub-display that displays values measured by various gauges such as a speedometer and a fuel gauge of the vehicle C, as the image. For example, the third display device 43 may be installed in a windshield of the vehicle C, and may be a head-up display (HUD). For example, the third display device 43 displays an image related to guide display of a navigation function or a warning image for warning a driver against an object detected by various sensors.

The positions or functions of the first display device 41, the second display device 42, and the third display device 43 are examples, and the present embodiment is not limited thereto. For example, the display device 40 may be a side view mirror having a display function.

FIG. 1B shows a layer configuration of images displayed on the first display device 41, the second display device 42, and the third display device 43. In the following description, layers L1, L2, shown in FIG. 1B may be collectively referred to as layers L.

Each layer L indicates a display region (for example, display region R1-1) in the display device 40. Display regions R1-1, R1-2, shown in FIG. 1B may be collectively referred to as display regions R.

That is, the display region R of the layer L is, for example, an actual memory space for display, such as a video random access memory (VRAM). Accordingly, an image to be displayed on the display device 40 is drawn in a corresponding region.

As shown in FIG. 1B, the image to be displayed on the first display device 41, the second display device 42, or the third display device 43 is constituted by five layers L. The number of layers L of the image to be displayed is not limited to five. The number of layers may be four layers or less or may be six layers or more as long as the image is constituted by a plurality of layers. That is, the display device 40 may display an image constituted by a plurality of layers L.

For example, a size of the display region R of each layer L is a size of a screen of the display device 40 on which the image is displayed. Specifically, the size of the display region R1-1 in the first display device 41 is substantially the same as the size of the screen of the first display device 41. The size of the display region R1-2 in the second display device 42 is substantially the same as the size of the screen of the second display device 42. The size of the display region R1-3 in the third display device 43 is substantially the same as the size of the screen of the third display device 43.

Combination images are drawn in the respective display regions R. The details of the combination images will be described with reference to FIG. 4. An image to be displayed on the display device 40 is acquired by layering the combination images drawn in the respective display regions R.

As shown in FIG. 1B, common layers L1, L2, and L3, and individual layers L4-1, L4-2, L4-3, L5-1, L5-2, and L5-3 are presented as the layers L. Each of the common layers L1, L2, and L3 includes all the display regions R of the first display device 41, the second display device 42, and the third display device 43. The individual layers L4-1 and L5-1, L4-2 and L5-2, and L4-3 and L5-3 correspond to the display regions R of the first display device 41, the second display device 42, and the third display device 43, respectively.

Now, a display control method of the related art will be described. In the display control method of the related art, images are drawn in individual layers which respectively correspond to a plurality of displays. That is, only the individual layers are present as the layers. Thus, in the display control method of the related art, it is necessary to control a display timing for each individual layer, that is, for each display device.

However, for example, when there is an attempt to link the display of the images among the plurality of display devices and there is an attempt to control a display timing for each display region, the control is complicated. Therefore, in the display control method of the related art, when there is an attempt to link the display among the plurality of display devices, a processing load increases.

Thus, in the display control method according to the embodiment, the common layers L1, L2, and L3 are prepared. Each of the common layers L1, L2, and L3 has the plurality of display regions R. Specifically, the display control device 1 according to the embodiment acquires layer information 31 (see FIG. 2) that defines the common layers L1, L2, and L3 having the display regions R of the plurality of display devices 40.

For example, as shown in FIG. 1B, the first common layer L1 includes the display region R1-1 of the first display device 41, the display region R1-2 of the second display device 42, and the display region R1-3 of the third display device 43. The common layer L2 as the second layer includes the display region R2-1 of the first display device 41, the display region R2-2 of the second display device 42, and the display region R2-3 of the third display device 43. The common layer L3 as the third layer includes the display region R3-1 of the first display device 41, the display region R3-2 of the second display device 42, and the display region R3-3 of the third display device 43. That is, each of the common layers L1, L2, and L3 includes all the display regions of the plurality of display devices 40.

As shown in FIG. 1B, the layers L as the fourth and fifth layers are the individual layers L4-1, L4-2, L4-3, L5-1, L5-2, and L5-3. The individual layers L4-1, L4-2, L4-3, L5-1, L5-2, and L5-3 correspond to the display regions R4-1, R4-2, R4-3, R5-1, R5-2, and R5-3, respectively. That is, the display control device 1 according to the embodiment acquires layer information 31 that defines the individual layers L4-1, L4-2, L4-3, L5-1, L5-2, and L5-3 which respectively correspond to the display regions R of the display device 40.

That is, the individual layers L4-1, L4-2, L4-3, L5-1, L5-2, and L5-3 are actual memory spaces indicating the display regions R. The common layers L1, L2, and L3 are virtual memory spaces in which a positional relationship between the actual memory spaces as the display regions R is defined based on a positional relationship between the display devices 40.

Hereinafter, the individual layers L4-1, L4-2, L4-3, L5-1, L5-2, and L5-3 may be collectively referred to as individual layers IL, and the common layers L1, L2, and L3 may be collectively referred to as common layers CL.

The display control device 1 according to the embodiment draws first combination images to be displayed so as to move among the plurality of display devices in the common layers CL, based on the acquired layer information 31. The display control device 1 draws second combination images to be independently displayed for the respective display devices 40 in the individual layers IL. Specific examples of the first combination image and the second combination image will be described with reference to FIG. 4.

The display control device 1 according to the embodiment combines the first combination images drawn in the common layers CL with the second combination images of the corresponding individual layers IL.

Specifically, the display control device 1 according to the embodiment extracts the display regions R1-1, R2-1, and R3-1 having the same size as that of the individual layers L4-1 and L5-1 of the first display device 41 among the display regions R of the common layers L1, L2, and L3. Hereinafter, the display control device 1 according to the embodiment outputs the images to the display device 40 for every layer L. That is, the display control device 1 may not respectively control display timings of the combination images of the common layers CL, and may adjust the display timings thereof. For example, the combination image is a motion image to be displayed such that a picture image such as an arrow moves. The motion image will be described below.

As stated above, the size of the common layer CL is defined as a virtual memory space having a size enough to include the plurality of display regions R, and thus, it is not necessary to control the display timing for each display region R even though the display is linked between the display devices. Accordingly, it is possible to reduce a processing load when the display is linked among the plurality of display devices 40.

The display system S according to the embodiment is mounted on the vehicle C, and thus, a user (particularly, a driver of the vehicle C) can link the display without feeling uncomfortable. Thus, the user can further concentrate on driving.

In addition to the positional relationship between the display regions R, magnification or color of an image to be displayed, fonts of characters, and display permission and prohibition information may be defined in the common layers CL. The definition of the information items in the common layers CL will be described below.

Figure 2:
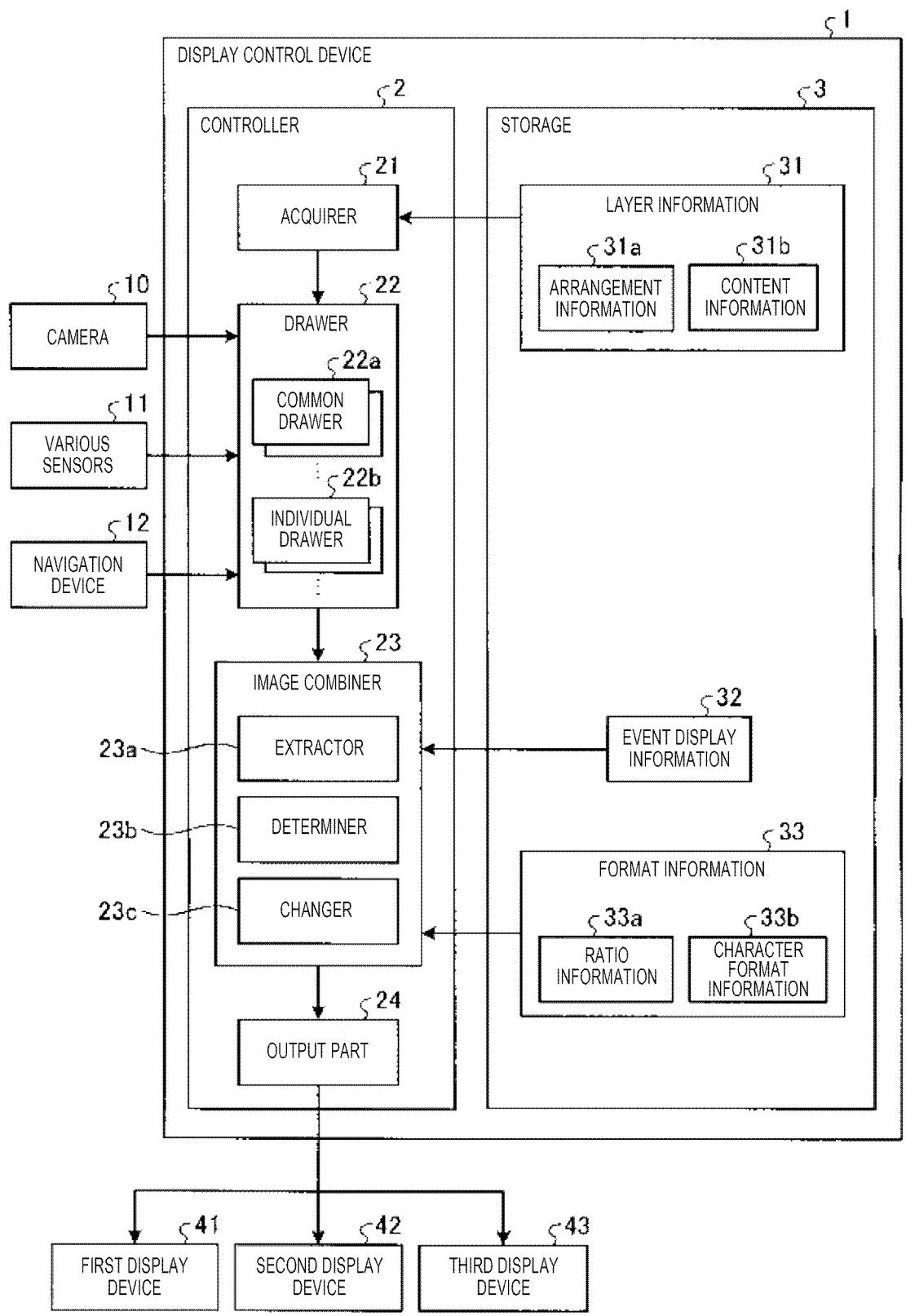
FIG. 2 shows a configuration of a display control device according to the embodiment.

Hereinafter, a configuration of the display control device 1 according to the embodiment will be described in detail with reference to FIG. 2. FIG. 2 is a block diagram showing the configuration of the display control device 1 according to the embodiment. As shown in FIG. 2, the display control device 1 according to the embodiment is connected to a camera 10, various sensors 11, and the navigation device 12.

For example, the camera 10 includes an imaging element such as a charge coupled device (CCD) or a complementary metal oxide semiconductor (CMOS), and is attached in a position in which a surrounding region of the vehicle C is captured. The number of cameras 10 may be one, or a plurality of cameras may be used.

For example, the various sensors 11 include a sensor that detects a speed or an acceleration of the vehicle C or a traveling state such as a turning state and a sensor that detects an object such as an obstacle present in the surrounding area of the vehicle C.

The navigation device 12 displays electronic map data stored in advance, and sets and guides a traveling path up to a destination set by the user of the vehicle C.

The display control device 1 according to the embodiment includes a controller 2 and a storage 3. The controller 2 includes an acquirer 21, a drawer 22, an image combiner 23, and an output part 24. The storage 3 stores the layer information 31, event display information 32, and format information 33.

For example, the display control device 1 according to the embodiment includes various circuits or a computer including a central processing unit (CPU), a read only memory (ROM), a random access memory (RAM), a hard disk drive (HDD), and an input and output port.

The CPU of the computer functions as the acquirer 21, the drawer 22, the image combiner 23, and the output part 24 of the controller 2 by reading a program stored in the ROM and executing the read program.

At least any one or all of the acquirer 21, the drawer 22, the image combiner 23, and the output part 24 of the controller 2 may be hardware such as application specific integrated circuit (ASIC) or a field programmable gate array (FPGA).

For example, the storage 3 is an RAM or an HDD. The RAM or the HDD stores the layer information 31, the event display information 32, the format information 33, and various program information items. The display control device 1 may acquire the program information and various information items through another computer or a portable recording medium connected to a wired or wireless network.

Figure 3B:
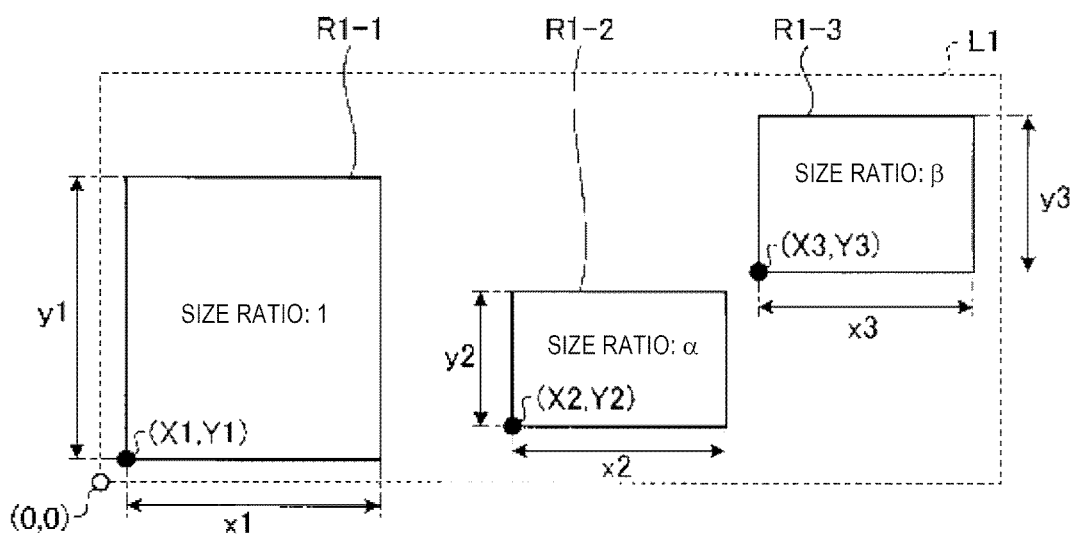
FIG. 3B is a diagram for describing the arrangement information.
Figure 3C:
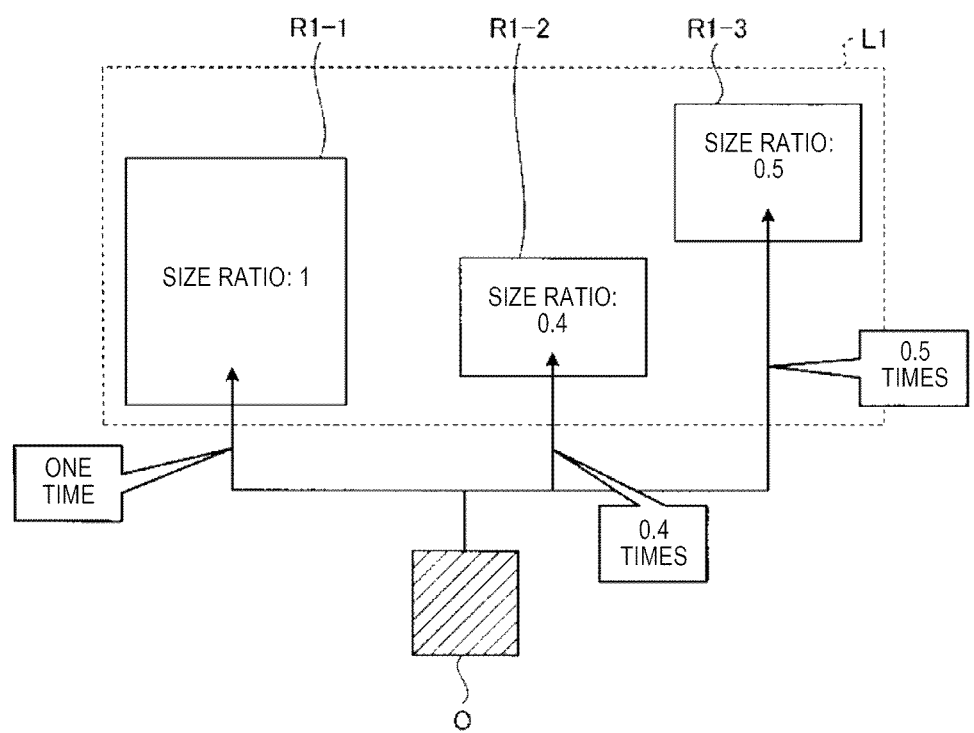
FIG. 3C is a diagram for describing the arrangement information.

The layer information 31 includes information regarding the definition of the layers L. For example, the layer information 31 includes arrangement information 31a and content information 31b. The layer information 31 will be described with reference to FIGS. 3A, 3B, and 3C. FIGS. 3A, 3B, and 3C are diagrams for describing the arrangement information 31a. FIG. 4 is a diagram for describing the content information 31b.

Initially, the arrangement information 31a will be described with reference to FIGS. 3A, 3B, and 3C. FIG. 3A shows position coordinates and size ratios of the first display device 41, the second display device 42, and the third display device 43. FIG. 3B is a schematic diagram showing the arrangement of the display regions R1-1, R1-2, and R1-3 in the common layer L1. FIG. 3C shows sizes when first combination images O are displayed in the display regions R.

As shown in FIG. 3A, the arrangement information 31a includes items of "layer ID", "positional relationship", and "size relationship". The "layer ID" is identification information for identifying each common layer CL. The "positional relationship" indicates position coordinates in the layers L based on a spatial positional relationship between the display devices 40. The "size relationship" indicates a size ratio of the display region R of the second display device 42 or the third display device 43 to the first display device 41. In FIG. 3A, the positional relationship and the size relationship between the first display device 41, the second display device 42, and the third display device 43 are equal in all the three common layers CL. The positional relationship and the size relationship may be different between the common layers CL.

FIG. 3B is a schematic diagram showing a table represented in FIG. 3A. In FIG. 3B, the common layer L1 having a layer ID of "1" is shown as a representative. As shown in FIG. 3B, the common layer L1 includes three display regions R1-1, R1-2, and R1-3. The number of display regions R1-1, R1-2, and R1-3 corresponds to the number of display devices 40. That is, when the number of display devices 40 is three, the number of display regions R1-1, R1-2, and R1-3 included in the common layer L1 is three. The common layer L1 may not include all the three display regions R1-1, R1-2, and R1-3, or may include any two display regions thereof.

As shown in FIG. 3B, the display regions R1-1, R1-2, and R1-3 are defined by absolute coordinates with a predetermined end point (for example, a lower-left vertex in the drawing) of the common layer L1 as an origin (0, 0). Specifically, the lower-left vertices of the display regions R1-1, R1-2, and R1-3 are defined as the origin (0, 0).

Specifically, the display region R1-1 is defined based on coordinates moved from the origin (0, 0) by a distance X1 in a positive X-axis direction (in a right direction in the drawing) and a distance Y1 in a positive Y-axis direction (in an up direction in the drawing). The display region R1-2 is defined based on coordinates moved from the origin (0, 0) by a distance X2 in the positive X-axis direction and a distance Y2 in the positive Y-axis direction. The display region R1-3 is defined based on coordinates moved from the origin (0, 0) by a distance X3 in the positive X-axis direction and a distance Y3 in the positive Y-axis direction.

Aspect ratios of the display regions R1-1, R1-2, and R1-3 are defined based on the screen sizes of the display devices 40. Specifically, the display region R1-1 has an aspect ratio of y1:x1. The display region R1-2 has an aspect ratio of y2:x2. The display region R1-3 has an aspect ratio of y3:x3.

For example, the size ratios of the display regions R1-1, R1-2, and R1-3 to the display region R1-1 are defined based on region areas. Specifically, the size ratio of the region area of the display region R1-1 is 1, the size ratio of the region area of the display region R1-2 is defined as 0.4, and the size ratio of the region area of the display region R1-3 is defined as 0.5. Vertical and horizontal lengths of the display regions R1-1, R1-2, and R1-3 are defined based on the defined size ratios and aspect ratios.

The size relationship between the display regions when the first combination images O are displayed in the display regions R1-1, R1-2, and R1-3 will be described with reference to FIG. 3C. As shown in FIG. 3C, the sizes of the first combination images are adjusted based on the size ratios of the display region R1-1, R1-2, and R1-3.

All the first combination images of which the sizes are adjusted have the same number of pixels. That is, the size ratios shown in FIG. 3C are size ratios of appearances when the first combination images are displayed on the display devices 40. The first combination images may be enlarged or reduced based on the size ratios of the display regions R1-1, R1-2, and R1-3. A method of enlarging and reducing the first combination image will be described below with reference to FIG. 6.

In FIGS. 3A, 3B, and 3C, the display regions R1-1, R1-2, and R1-3 are defined based on the absolute coordinates. However, the display regions are not limited to be defined based on the absolute coordinates, and the display regions may be defined based on a relative positional relationship or an angular relationship between the display regions R1-1, R1-2, and R1-3.

Hereinafter, the content information 31b will be described with reference to FIG. 4. As shown in FIG. 4, the content information 31b includes items of "layer ID", "classification", "display device ID", and "display content".

The "layer ID" is identification information for identifying each layer L. The "classification" indicates the type of classification of the layer L. The "display device ID" is identification information for identifying the plurality of display devices 40. The "display content" indicates the content of the combination image drawn in the layer L. Among the "display contents", the "display contents" of "layer 1", "layer 2", and "layer 3" include the first combination images to be displayed so as to move among the plurality of display devices 40. The "layer 4" and the "layer 5" include the second combination images to be independently displayed for the display devices 40.

For example, when the layer ID is "layer 1", the first layer is the common layer L1, and character information or a caution image is displayed in common between the display regions R1-1, R1-2, and R1-3 of the first display device 41, the second display device 42, and the third display device 43.

That is, the drawer 22 to be described below draws different kinds of first combination images in the common layers CL. Accordingly, for example, caution is displayed in the common layer CL of which the color or size is changed. An arrow or design picture is displayed in the common layer CL of which the size is not changed. A moving image is displayed in the common layer CL in which traveling regulations are effective. As stated above, it is possible to perform appropriate display control based on the kind of the first combination image. The color or display size when the first combination image is displayed and the explanation indicating whether or not to display the traveling regulations will be described below.

Next, the event display information 32 is information indicating the contents to be displayed in each layer L depending on the event for the vehicle C. Now, the event display information 32 will be described with reference to FIG. 5.

FIG. 5 shows the event display information 32. As shown in FIG. 5, the event display information 32 includes the items of "layer ID" and "event classification". The "event classification" indicates the classification of the event satisfying a predetermined condition for the vehicle C.

For example, when the event classification is "accident occurs ahead", "layer 1" draws a caution image (see FIG. 4) indicating the occurrence of an accident or a combination image of an instruction for prompting a bypassing. Meanwhile, the "layer 2" and the "layer 3" do not draw the combination images. The individual layers which are "layer 4" and "layer 5" are constantly displayed.

Subsequently, the format information 33 includes information regarding a display format such as the display size or font of the character information or a picture image to be drawn in the display region R. The format information 33 includes ratio information 33a and character format information 33b. The ratio information 33a is information regarding the display size of the picture image such as the arrow. The character format information 33b is information regarding the display format of the character information. Now, the format information 33 will be described with reference to FIGS. 6 and 7.

FIGS. 6 and 7 are diagram for describing the format information 33. FIG. 6 shows the ratio information 33a. FIG. 7 shows the character format information 33b. Initially, the ratio information 33a will be described with reference to FIG. 6.

As shown in FIG. 6, the ratio information 33a includes items of "layer ID", the first display device (reference)", and "display size ratio". The "first display device (reference)" indicates a reference of the display size on the plurality of display devices 40. The "first display device (reference)" uses the display size of the first display device 41 as a reference in the example of FIG. 6. The present embodiment is not limited to the case where the display size of the first display device 41 is used as the reference, and the display size of the second display device 42 or the third display device 43 may be used as the reference. The "display size ratio" indicates ratios of the display sizes of the second display device 42 and the third display device 43 to the "first display device (reference)" for each event.

For example, when the event is "accident occurs ahead", as the display size ratio of the "layer 1" of the "second display device" is "1". That is, this case means that an image is displayed on the second display device 42 with the same display size as that of the first display device 41.

In the case of "accident occurs ahead", when the display size ratio of the "layer 1" of the "third display device" is "0.5", an image is displayed on the third display device 43 with half of the display size of the first display device 41.

Hereinafter, the character format information 33b will be described with reference to FIG. 7. As shown in FIG. 7, the character format information 33b includes items of "layer ID", "entry", and "event classification". The "entry" indicates an entry of the classification of the display format of text of the character information to be displayed.

For example, when the event classification is "accident occurs ahead", Gothic typefaces are used in the first display device 41, Ming typefaces are used in the second display device 42, and Gothic typefaces are used in the third display device 43 in the "layer 1". The size ratio of the first display device 41 is "1" as the reference, the size ratio of the second display device 42 is "0.8", and the size ratio of the third display device 43 is "1". The color of the first display device 41 is white, the color of the second display device 42 is gray, and the color of the third display device 43 is orange.

The controller 2 acquires the layer information 31 that defines the layers L. The controller 2 draws the combination images in the individual layers IL and the common layers CL included in the layer information 31. The controller 2 outputs the combination images to the display devices 40.

The acquirer 21 acquires the layer information 31 that defines the individual layers IL corresponding to the display regions R of the display device 40 and the common layers CL including the display regions R of the plurality of display devices 40.

As shown in FIG. 2, the acquirer 21 acquires the layer information 31 stored in the storage 3 in advance. Although it has been described in FIG. 2 that the layer information 31 is stored in the storage 3 in advance, the present embodiment is not limited thereto. For example, the acquirer 21 may acquire the layer information 31 from an external server device.

The drawer 22 draws the combination images in the individual layers IL and the common layers CL based on the layer information 31 acquired by the acquirer 21. Specifically, the drawer 22 includes a plurality of common drawers 22a and a plurality of individual drawers 22b. The common drawers 22a and the individual drawers 22b are, for example, graphics processing units (GPU). That is, the drawer 22 includes GPUs as much as the number of layers L.

The drawer 22 does not need to necessarily include the GPUs as much as the number of layers L. The drawer 22 may include a GPU including all the plurality of common drawers 22a and a GPU including all the plurality of individual drawers 22b. That is, the drawer 22 may include GPUs corresponding to the common drawers 22a and the individual drawers 22b one by one.

The common drawer 22a draws the first combination image in the common layer CL. For example, the common drawers 22a draw the images in the common layers CL corresponding to the contents of the combination images based on the content information 31b of the layer information 31 acquired by the acquirer 21.

For example, when there is an obstacle on the right side of the vehicle C, the third display device 43 warns the user about the obstacle. Specifically, based on the layer information 31, the common drawers 22a draw character information indicating "attention on right side" in the first common layer L1, draw an arrow indicating the right side in the second common layer L2, and draw a real-time video of the camera 10 that captures the right side in the third common layer L3. In this case, the motion image moving as if character information or the arrow flows to the right is drawn as the combination image. The combination image will be described with reference to FIG. 8.

The individual drawers 22b draw the second combination images to be independently displayed for the display devices 40 based on the content information 31b of the layer information 31. For example, the individual drawers 22b draw a map image of the navigation device 12 or an image indicating a position of the vehicle corresponding to a position of the map image on the first display device 41 (see FIG. 4). That is, the individual drawers 22b draw the images to be constantly displayed on the display devices 40.

The image combiner 23 includes an extractor 23a, a determiner 23b, and a changer 23c. The image combiner 23 combines the first combination images drawn in the common layers CL by the drawers 22 with the second combination images of the individual layers IL corresponding to the first combination images.

The extractor 23a adjusts the first combination images drawn in the common layers CL by the drawers 22 according to the sizes of the individual layers IL corresponding to the first combination images, and extracts the adjusted first combination images. Specifically, the extractor 23a cuts the first combination images drawn in the common layers CL with the sizes of the display regions of the display devices 40.

The determiner 23b determines the display timings of the display devices 40 based on the arrangement of the display regions R of the common layers CL. Now, the processing contents of the determiner 23b will be described with reference to FIG. 8.

Figure 8:
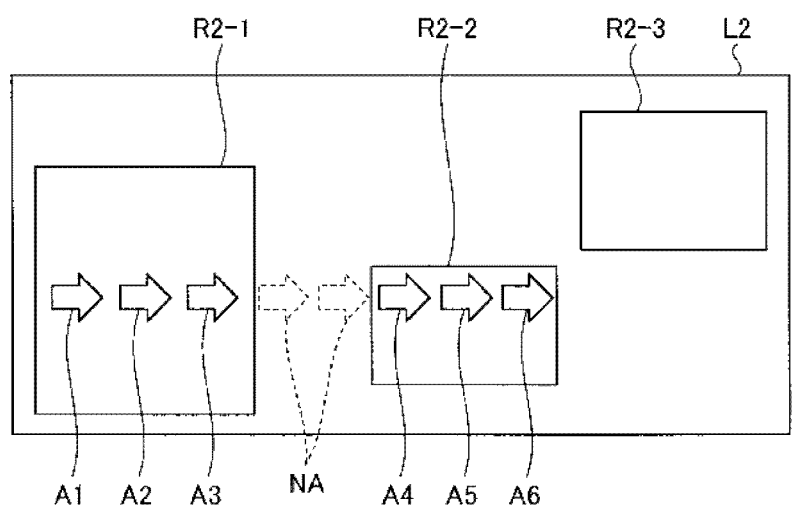
FIG. 8 shows processing contents of a determiner.

FIG. 8 shows the processing contents of the determiner 23b according to the embodiment. FIG. 8 shows an example in which motion images A1 to A6 moving as if an arrow flows from the left to the right are drawn as the first combination images in the second common layer L2 (see FIG. 4). Specifically, the example in which the images move in order from the motion image A1 to the motion image A6 is illustrated. FIG. 8 shows non-display images NA which are the same arrow images as the motion images A1 to A6 and are not displayed on the display devices 40.

The determiner 23b determines a disappearance period from when the displayed first combination image disappears on a predetermined display device 40 to when the disappeared first combination image is displayed again on another display device 40 based on the arrangement information 31a of the common layer CL.

Specifically, as shown in FIG. 8, the determiner 23b sets the non-display images NA between the motion images A1 to A6. Specifically, the determiner 23b sets the non-display images NA between the motion image A3 and the motion image A4.

The determiner 23b determines the display timings such that the motion images A1 to A3, the non-display images NA, and the motion images A4 to A6 are displayed so as to move in order. Accordingly, a time lag occurs until the motion image A4 is displayed as much as the non-display images NA after the motion image A3 is displayed. In other words, the determiner 23b delays the display timing of the motion image A4 based on a distance between the display region R2-1 and the display region R2-2. This is achieved with consideration for a spacing between the actual installation positions of the first display device 41 and the second display device 42 within the vehicle C (see FIG. 1A).

Specifically, all intervals between the non-display images NA and the motion images A1 to A6 are the substantially same. That is, the user sees as if the arrow disappears on the display device 40 as much as the non-display images NA between the motion image A3 and the motion image A4. The number of non-display images NA, that is, the disappearance period is determined based on the interval between the display regions R2-1 and R2-2. Accordingly, a visual effect as if the arrows which are the first combination images are naturally moving between the display devices 40 can be given to the user.

That is, the display timings are delayed, and thus, the user can see as if the motion images A1 to A6 move between the display devices 40 for user's driving. When the motion images A1 to A6 are linked between the display devices 40, the user can smoothly see a linkage between the motion images A1 to A6.

In the following description of FIG. 8, the non-display images NA are virtually set between the motion image A3 and the motion image A4. However, it is not necessary to necessarily set the non-display images NA. For example, the interval between the motion image A3 and the motion image A4 may be adjusted based on the distance between the display region R2-1 and the display region R2-2.

For example, the determiner 23b may determine the display timings with consideration for a traveling speed of the vehicle C. Specifically, the determiner 23b delays the display timings of the display devices 40 as the traveling speed of the vehicle C becomes fast.

For example, the determiner 23b lengthens the intervals between the motion images A1 to A6 as the traveling speed of the vehicle C becomes fast. Accordingly, it is possible to prevent the user from missing the display of the display device 40 as the traveling speed of the vehicle C becomes fast.

When an event satisfying a predetermined condition occurs for the vehicle C, the changer 23c changes the display formats of the combination images drawn by the drawer 22 for the plurality of display devices 40. For example, when an event included in the ratio information 33a and the character format information 33b occurs, the changer 23c changes the display size, font, or color of the combination images corresponding to the event.

The changer 23c may change at least one of the display size, the font, and the color. That is, the changer 23c changes at least one of the display size, the font of the character, and the color of the first combination image based on the format information 33 of the common layer CL.

Accordingly, it is possible to optimize the way for displaying the images on the display devices 40. Thus, the user of the vehicle C can easily recognize the images. That is, since the same first combination image can be displayed for the display devices 40 by changing the color or the font thereof, it is possible to improve user's recognition for information.

When the event occurring for the vehicle C does not satisfy the predetermined condition, the changer 23c may prohibit the change of the display. Alternatively, the changer 23c may prohibit the display itself.

When an event related to the traveling regulations of the vehicle C occurs, the changer 23c prohibits the combination images from being displayed on the display device 40 corresponding to the traveling regulations among the plurality of display devices 40. The processing contents of the changer will be described in detail with reference to FIG. 9.

Figure 9:
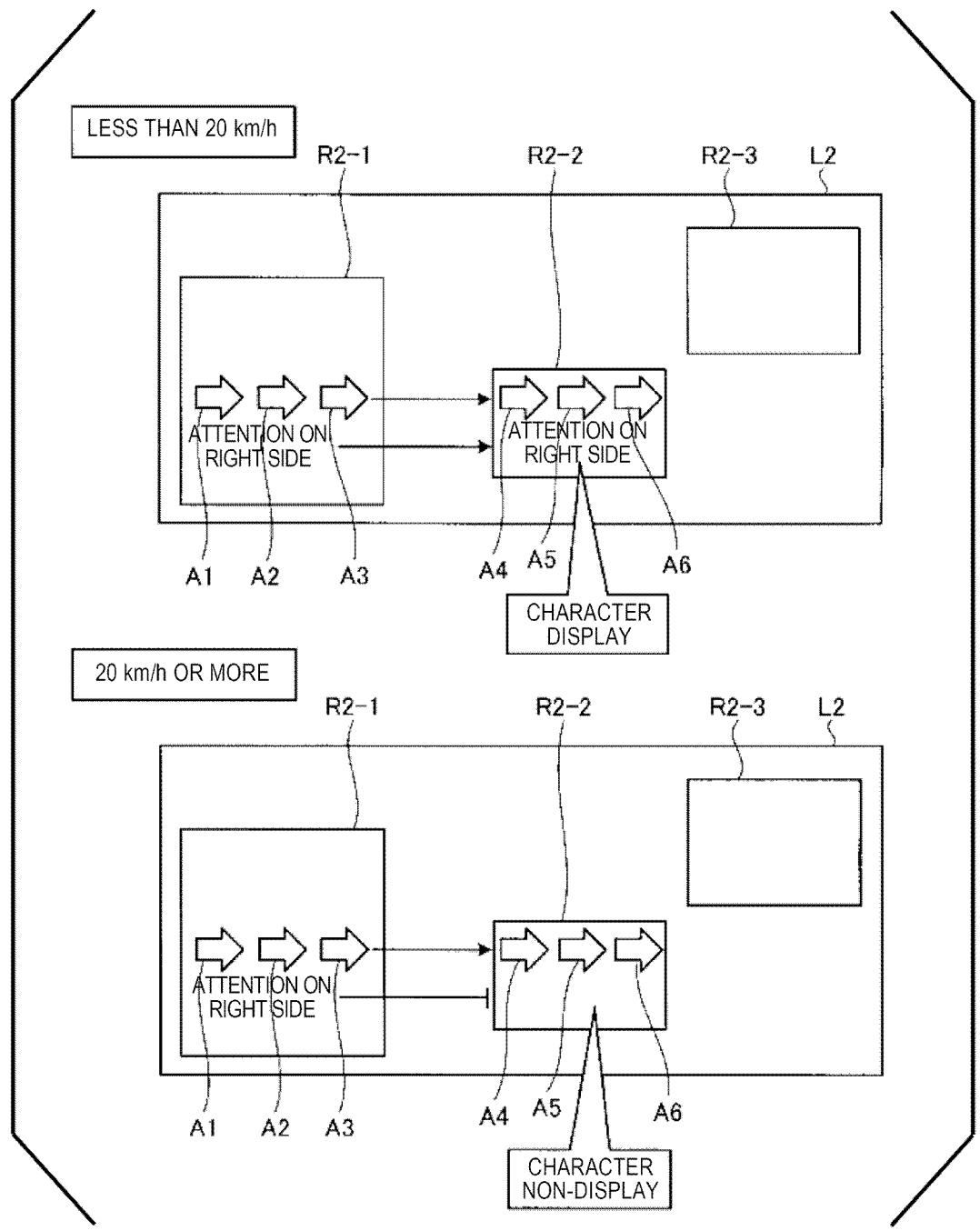
FIG. 9 shows processing contents of a changer.

FIG. 9 shows the processing contents of the changer 23c. FIG. 9 shows the processing contents of the changer 23c when the traveling speed of the vehicle C is less than 20 km/h and is equal to or greater than 20 km/h. In FIG. 9, a case where the traveling speed is equal to or greater than 20 km/h, and thus, the event related to the traveling regulations occurs is shown.

For example, as shown in FIG. 9, the determiner 23b moves the character and arrow images from the display region R2-1 to the display region R2-2. In this case, the user of the vehicle C instantaneously recognizes the arrow, but since it takes time to recognize the characters, there is a concern that users' attention is distracted from the front.

For example, when the traveling speed of the vehicle C is equal to or greater than a predetermined traveling speed, the changer 23c prohibits the character image from moving between the display devices 40. Specifically, as shown in FIG. 9, when the traveling speed of the vehicle C is equal to or greater than 20 km/h, the changer 23c prohibits the character image from moving from the display region R2-1 to the display region R2-2.

That is, for example, when the traveling speed is equal to or greater than 20 km/h, the changer 23c adds the information (display permission and prohibition information) indicating whether or not to display the characters, as the information for prohibiting the character display, to the common layers CL for the display devices 40. The changer 23c determines whether or not display the characters on the display device 40 based on the display permission and prohibition information.

Accordingly, the character image is displayed on the first display device 41, and is not displayed on the second display device 42. Therefore, it is possible to prevent the user from unnecessarily watching the character. Thus, it is possible to prevent users' attention from being distracted from the front. For example, it is possible to easily perform the control such that the first combination images are displayed on the first display device 41 and the second display device 42 while the first combination images are not displayed on the third display device 43 during the traveling of the vehicle C.

As shown in FIG. 9, when the traveling speed of the vehicle C is less than 20 km/h, the changer 23c may move the characters from the display region R2-1 to the display region R2-2.

The traveling regulations are not limited to the traveling speed of the vehicle C. For example, when a person is present near the vehicle C, the changer 23c may prohibit the characters from moving from the display region R2-1 to the display region R2-2. That is, the event related to the traveling regulations may be an event indicating that the user needs to particularly pay attention to a surrounding region.

The changer 23c aligns the intervals between the motion images A1 to A6 drawn on the plurality of display devices 40. The processing contents of the changer 23c will be described with reference to FIG. 10.

Figure 10:
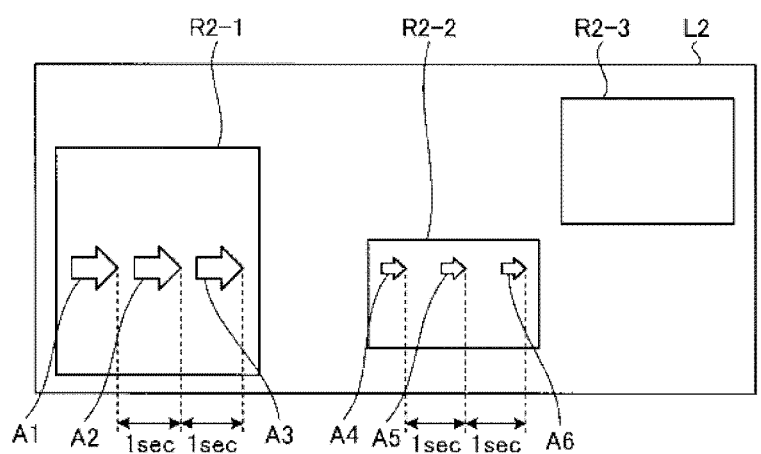
FIG. 10 shows the processing contents of the changer.

FIG. 10 shows the processing contents of the changer 23c. FIG. 10 shows a case where the motion images A1 to A6 move at intervals of one second. When the first combination images (motion images A1 to A6) move from a predetermined display device 40 to another display device 40 based on the arrangement information 31a, the changer 23c determines at least one of the movement speeds and the display sizes of the images on the another display device 40.

Specifically, the changer 23c changes the display sizes of the motion images A1 to A6 depending on the areas of the display region R2-1, and the display region R2-2, based on the "size relationship" (see FIG. 3A) of the arrangement information 31a. That is, the changer 23c adjusts the motion images A4 to A6 according to the size of the display region R2-2 such that these images are smaller than the motion images A1 to A3.

In FIG. 10, the motion images A1 to A6 move from the left to the right, for example, at intervals of one second. That is, the user sees that the motion image A1 is initially displayed. Thereafter, the motion image A2, the motion image A3, the motion image A4, the motion image A5, and the motion image A6 are displayed in order. The intervals between the motion images A1 to A6 are not limited to the intervals of one second. An arbitrary interval may be set.

The changer 23c does not shorten the intervals between the motion image A4 to the motion image A6 such that the intervals are adjusted according to the size of the display region R2-2. That is, as shown in FIG. 10, the changer 23c aligns the intervals between the motion images A1 to A3 and the intervals between the motion images A4 to A6.

Specifically, the changer 23c calculates vertical and horizontal sizes per pixel from the size and the number of pixels for each display region R. The changer 23c aligns the movement speeds of the display region R2-1 and the display region R2-2 based on the vertical and horizontal sizes per pixel.

Accordingly, it is possible to align the movement speeds of the motion images A1 to A6 among the plurality of display devices 40 irrespective of the screen sizes of the display devices 40. Thus, it is possible to prevent the user from mistaking that the movement speeds of the motion images A4 to A6 are suddenly slowed. That is, even when the resolutions of the display devices 40 are different, the user can see as if the display sizes or the movement speeds of the first combination images are constant. The display size can be changed so as to match the display device 40 even when the same first combination image is used. Thus, for example, the caution display is enlarged on a particular display device 40, and thus, it is possible to improve user's recognition.

Referring back to FIG. 2, the output part 24 will be described. The output part 24 outputs the combination images extracted from the layers L to the corresponding display device 40. For example, the output part 24 outputs the combination images of the display regions R1-1, R2-1, R3-1, R4-1, and R5-1 to the first display device 41. Accordingly, the combination images of the display regions R are layered, and the layered combination images are displayed on the first display device 41.

Figure 11:
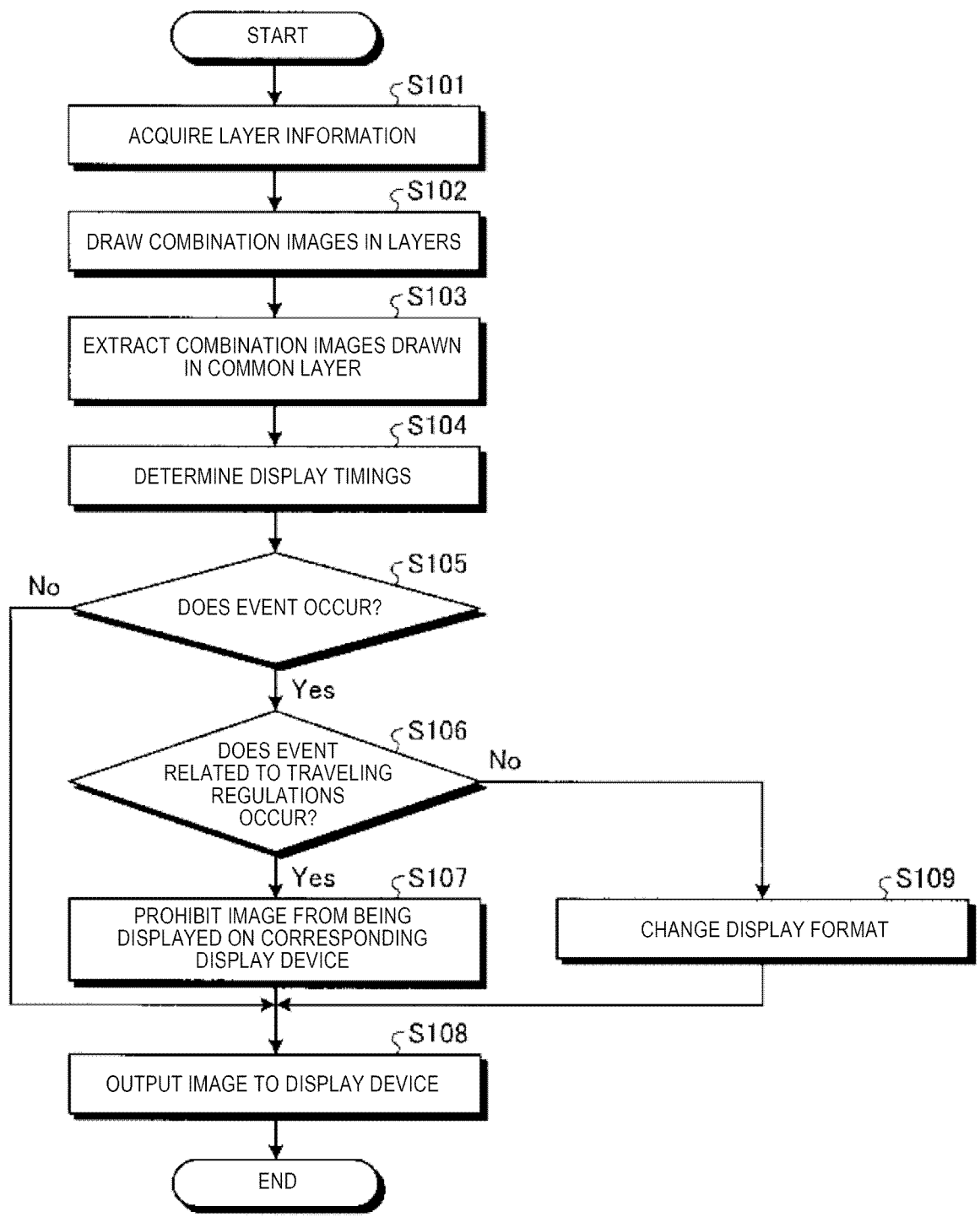
FIG. 11 shows a processing procedure of display processing performed by the display control device according to the embodiment.

Hereinafter, a processing procedure of display processing performed by the display control device 1 according to the embodiment will be described with reference to FIG. 11. FIG. 11 is a flowchart showing the processing procedure of the display processing performed by the display control device 1 according to the embodiment.

As shown in FIG. 11, the acquirer 21 initially acquires the layer information 31 that defines the individual layers L corresponding to the display regions R of the display device 40 and the common layers CL including the display regions R of the plurality of display devices 40 as the layers L on the image constituted by the plurality of layers L (step S101).

Subsequently, the drawer 22 draws the combination images in the individual layers IL and the common layers CL based on the layer information 31 acquired by the acquirer 21 (step S102). Specifically, the drawer 22 draws the first combination images in the common layers CL, and draws the second combination images in the individual layers IL.

Subsequently, the extractor 23a adjusts the first combination images drawn in the common layers CL by the drawer 22 according to the corresponding individual layers IL, and extracts the adjusted first combination images (step S103).

Thereafter, the determiner 23b determines the display timings for the display devices 40 based on the arrangement of the display regions R in the common layers CL (step S104). For example, the determiner 23b determines a disappearance period from when the first combination image disappears on a predetermined display device 40 to when the disappeared first combination image is displayed on another display device 40.

Subsequently, the changer 23c determines whether or not an event satisfying a predetermined condition occurs for the vehicle C (step S105). Thereafter, when the event satisfying the predetermined condition occurs for the vehicle C (step S105, Yes), the changer 23c determines whether or not the occurred event is the event related to the traveling regulations of the vehicle C (step S106).

Subsequently, when it is determined that the event related to the traveling regulations of the vehicle C occurs (step S106, Yes), the changer 23c prohibits the combination images from being displayed on the display device 40 corresponding to the traveling regulations among the plurality of display devices 40 (step S107). That is, the combination images are permitted to be displayed on the display device 40 other than the display device 40 corresponding to the traveling regulations.

Subsequently, the output part 24 outputs the combination images extracted by the extractor 23a to the corresponding display device 40 (step S108), and the processing is ended.

That is, the combination images are output to the display device 40 for which the display of the combination images is permitted.

Meanwhile, when the event satisfying the predetermined condition does not occur for the vehicle C in step S105 (step S105, No), the changer 23c does not change the display format. In this case, the processing proceeds to step S108.

When the event related to the traveling regulations of the vehicle C does not occur in step S106 (step S106, No), the changer 23c changes the display formats of the combination images for the display devices 40 (step S109).

As described above, the display control device 1 according to the embodiment includes the acquirer 21, the drawer 22, and the image combiner 23. The acquirer 21 acquires the layer information 31 that defines the individual layers IL corresponding to the display regions R of the display device 40 and the common layers CL including the display regions R of the plurality of display devices 40, as the layers L of the image constituted by the plurality of layers L. Based on the layer information 31 acquired by the acquirer 21, the drawer 22 draws the first combination images to be displayed so as to move among the plurality of display devices 40 in the common layers CL, and draws the second combination images to be independently displayed for the display devices 40 in the individual layers L. The image combiner 23 combines the first combination images drawn in the common layers CL by the drawer 22 with the second combination images of the corresponding individual layers IL. Accordingly, when the display is linked, it is not necessary to control the display timings for the display regions R, and thus, it is possible to reduce a processing load when the display is linked among the plurality of display devices 40.

It has been described in the aforementioned embodiment that the display devices 40 installed on the front side within the cabin of the vehicle C are used. However, the present embodiment is not limited thereto. For example, the display devices 40 may be display devices installed at back seats of the vehicle C.

It has been described in the aforementioned embodiment that the common layer CL includes all the display regions R of the plurality of display devices 40. However, the common layer CL is not necessary to include all the display regions R. For example, the common layer L1 includes three display regions R1-1, R1-2, and R1-3 (see FIG. 1B). However, the common layer L1 may include two display regions R1-1 and R1-2. In this case, the display region R1-3 is constituted by the individual layer IL.

Effects or modification examples are easily acquired by those skilled in the art. A broader aspect of the present invention is not limited to the aforementioned representative embodiment. However, the present invention may be changed in various manners without departing from the spirit or scope of the general invention as defined by the appended claims and their equivalents.

While the invention has been shown and described in detail, the foregoing description is in all aspects illustrative and not restrictive. It is therefore understood that numerous other modifications and variations can be devised without departing from the scope of the invention.

What is claimed is:

1. A display control device that displays an image, the display control device comprising:
   a controller including a processor and a memory, the controller being configured to:
      acquire layer information that defines (i) an individual layer having a display region corresponding to a display device of each of a plurality of display devices, and (ii) a common layer including a plurality of display regions corresponding to all of the plurality of display devices, as layers of images each constituted by a plurality of layers;

generate first combination images to be displayed so as to move among the plurality of display devices in the common layer, and generate second combination images to be independently displayed by each of the plurality of display devices in the individual layers, based on the acquired layer information;

when one of the first combination images moves from a first display device to a second display device of the plurality of display devices, set display timings of the plurality of display devices by determining a movement speed of the one of the first combination images between the first and second display devices based on a distance between the first display device and the second display device, which is included in the acquired layer information; and combine the first combination images generated in the common layer with the second combination images generated in the corresponding individual layers.

2. The display control device according to claim 1, wherein:

the common layer includes arrangement information that defines a spatial positional relationship indicating arrangement of the plurality of display devices, and the controller is configured to determine a disappearance period of the set display timings from when one of the first combination images disappears on the first display device of the plurality of display devices to when the one of the first combination images is displayed on the second display device of the plurality of display devices based on the arrangement information of the common layer.

3. The display control device according to claim 1, wherein:

the common layer includes size information that defines a size relationship between all of the display regions of the plurality of display devices, and the controller is configured to determine at least one of the movement speed and a display size on another display device of the plurality of display devices based on the size information of the common layer when one of the first combination images moves from the first display device of the plurality of display devices to the second display device of the plurality of display devices.

4. The display control device according to claim 1, wherein:

the common layer includes display permission and prohibition information indicating whether to display the first combination images on the plurality of display devices, and the controller is configured to determine whether to display one of the first combination image on the second display device of the plurality of display devices based on the display permission and the prohibition information of the common layer when the one of the first combination image moves from the first display device of the plurality of display devices to the second display device of the plurality of display devices.

5. The display control device according to claim 1, wherein:

the common layer includes format information including at least one information of color or a font of a character as display formats of the first combination images for the plurality of display devices, and the controller is configured to determine the display formats of the first combination images on the plurality of display devices based on the format information of the common layer.

6. The display control device according to claim 1, wherein:

the layer information defines a plurality of common layers, and the controller is configured to generate different types of first combination images in the plurality of common layers.

7. A display control method of displaying images, the display control method comprising steps of:

(a) acquiring, by a controller including a processor and a memory, layer information that defines (i) an individual layer having a display region corresponding to a display device of each of a plurality of display devices, and (ii) a common layer including a plurality of display regions corresponding to all of the plurality of display devices, as layers of images each constituted by a plurality of layers;

(b) generating, by the controller, first combination images to be displayed so as to move among the plurality of display devices in the common layer, and generating, by the controller, second combination images to be independently displayed by each of the display devices in the individual layers, based on the acquired layer information in the step (a);

(c) when one of the first combination images moves from a first display device to a second display device of the plurality of display devices, setting, by the controller, display timings of the plurality of display devices by determining a movement speed of the one of the first combination images between the first and second display devices based on a distance between the first display device and the second display device, which is included in the acquired layer information; and (d) combining, by the controller, the first combination images generated in the common layer in the step (b) with the second combination images generated in the corresponding individual layers.

8. The display control method according to claim 7, wherein:

the common layer includes arrangement information that defines a spatial positional relationship indicating arrangement of the plurality of display devices, and the step (d) determines a disappearance period of the display timings from when one of the first combination images disappears on the first display device of the plurality of display devices to when the one of the first combination images is displayed on the second display device of the plurality of display devices based on the arrangement information of the common layer.

9. The display control method according to claim 7, wherein:

the common layer includes size information that defines a size relationship between each of the display regions of the plurality of display devices, and the step (d) determines at least one of the movement speed and a display size on the second display device of the plurality of display devices based on the size information of the common layer when one of the first combination images moves from the first display device of the plurality of display devices to the second display device of the plurality of display devices.

10. The display control method according to claim 7, wherein:
the common layer includes display permission and prohibition information indicating whether to display the first combination images on the plurality of display devices, and
the step (d) determines whether to display one of the first combination images on the second display device of the plurality of display devices based on the display permission and prohibition information of the common layer when the one of the first combination images moves from the first display device of the plurality of display devices to the second display device of the plurality of display devices.

11. The display control method according to claim 7, wherein:
the common layer includes format information including at least one information of color or a font of a character as display formats of the first combination images for the plurality of display devices, and
the step (d) determines the display formats of the first combination images on the plurality of display devices based on the format information of the common layer.

12. The display control method according to claim 7, wherein:
the layer information defines a plurality of common layers, and
the step (d) generates different types of first combination images in the plurality of common layers.

13. A display control system that displays images, the display control system comprising:
a display control device including a controller having a processor and a memory, the controller being configured to:
acquire layer information that defines (i) an individual layer having a display region corresponding to a display device of each of a plurality of display devices, and (ii) a common layer including a plurality of display regions corresponding to all of the plurality of display devices, as layers of images each constituted by a plurality of layers,
generate first combination images to be displayed so as to move among the plurality of display devices in the common layer, and generate second combination images to be independently displayed by each of the plurality of display devices in the individual layers, based on the acquired layer information,
when one of the first combination images moves from a first display device to a second display device of the plurality of display devices, set display timings of the plurality of display devices by determining a movement speed of the one of the first combination images between the first and second display devices based on a distance between the first display device and the second display device, which is included in the acquired layer information, and
combine the first combination images generated in the common layer with the second combination images generated in the corresponding individual layers; and
a display device that displays an image output from the display control device.

14. The display control system according to claim 13, wherein:
the common layer includes arrangement information that defines a spatial positional relationship indicating arrangement of the plurality of display devices, and
the controller is configured to determine a disappearance period of the display timings from when one of the first combination images disappears on the first display device of the plurality of display devices to when the one of the first combination images is displayed on the second display device of the plurality of display devices based on the arrangement information of the common layer.

15. The display control system according to claim 13, wherein:
the common layer includes size information that defines a size relationship between the display regions of the plurality of display devices, and
the controller is configured to determine at least one of the movement speed and a display size on the second display device of the plurality of display devices based on the size information of the common layer when one of the first combination image moves from the first display device of the plurality of display devices to the second display device of the plurality of display devices.

16. The display control system according to claim 13, wherein:
the common layer includes display permission and prohibition information indicating whether to display the first combination images on the plurality of display devices, and
the controller is configured to determine whether to display one of the first combination images on the second display device of the plurality of display devices based on the display permission and prohibition information of the common layer when the one of the first combination images moves from the first display device of the plurality of display devices to the second display device of the plurality of display devices.

17. The display control system according to claim 13, wherein:
the common layer includes format information including at least one information of color or a font of a character as display formats of the first combination images for the plurality of display devices, and
the controller is configured to determine the display formats of the first combination images on the plurality of display devices based on the format information of the common layer.

18. The display control system according to claim 13, wherein:
the layer information defines a plurality of common layers, and
the controller generates different types of first combination images in the plurality of common layers.

* * * * *